US009348550B2

(12) United States Patent
Kadota

(10) Patent No.: US 9,348,550 B2
(45) Date of Patent: *May 24, 2016

(54) NON-TRANSITORY MACHINE-READABLE MEDIUM AND COMMUNICATION RELAY APPARATUS

(71) Applicant: Brother Kogyo Kabushiki Kaisha, Nagoya-shi, Aichi-ken (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,752

(22) Filed: Aug. 27, 2013

(65) Prior Publication Data

US 2014/0063544 A1    Mar. 6, 2014

(30) Foreign Application Priority Data

Sep. 3, 2012 (JP) .................................. 2012-193177

(51) Int. Cl.
*G06F 3/12* (2006.01)
*G06F 13/38* (2006.01)

(52) U.S. Cl.
CPC ............ *G06F 3/1287* (2013.01); *G06F 13/385* (2013.01)

(58) Field of Classification Search
None
See application file for complete search history.

(56) References Cited

U.S. PATENT DOCUMENTS

| 5,220,674 | A * | 6/1993 | Morgan et al. ................. 709/223 |
| 7,383,321 | B2 | 6/2008 | Moyer et al. |
| 7,583,400 | B2 | 9/2009 | Yagita |
| 7,958,205 | B2 | 6/2011 | Moyer et al. |
| 8,645,500 | B2 | 2/2014 | Moyer et al. |
| 8,687,219 | B2 | 4/2014 | Sato |
| 8,760,677 | B2 | 6/2014 | Kanada |
| 9,110,611 | B2 | 8/2015 | Kadota |
| 2003/0037108 | A1 | 2/2003 | Peiffer et al. |
| 2003/0091015 | A1 | 5/2003 | Gassho et al. |
| 2007/0033646 | A1* | 2/2007 | Tosey et al. ..................... 726/15 |
| 2007/0173077 | A1* | 7/2007 | Wang ............................. 439/1 |
| 2007/0253390 | A1 | 11/2007 | Gassho et al. |
| 2009/0158052 | A1 | 6/2009 | Yasuda et al. |
| 2009/0237728 | A1 | 9/2009 | Yamamoto |

(Continued)

FOREIGN PATENT DOCUMENTS

JP    2011-257945    12/2011

OTHER PUBLICATIONS

IPP USB Specification (IPP over USB) Version 1.0 Draft (Source: ftp://ftp.pwg.org/pub/pwg/ipp/whitepaper/draft-ippusbspecification-20110510.pdf).

(Continued)

*Primary Examiner* — John Wallace
(74) *Attorney, Agent, or Firm* — Banner & Witcoff, Ltd.

(57) ABSTRACT

A process, machine-readable instructions, and a system are described in which two communication sessions are attempted to be established between a client application and an image processing apparatus. In some examples, the first communication session is permitted while delaying the operation of the second communication session until the first communication session has completed.

12 Claims, 13 Drawing Sheets

(56) References Cited

U.S. PATENT DOCUMENTS

| | | | |
|---|---|---|---|
| 2010/0097644 | A1 | 4/2010 | Takahashi |
| 2010/0268801 | A1 | 10/2010 | Yukimasa |
| 2011/0001999 | A1 | 1/2011 | Nanaumi |
| 2011/0134465 | A1 | 6/2011 | Gha |
| 2011/0188075 | A1 | 8/2011 | Narushima et al. |
| 2011/0194146 | A1 | 8/2011 | Sato |
| 2011/0302512 | A1 | 12/2011 | Ishii |
| 2012/0016797 | A1* | 1/2012 | Smith et al. ............... 705/41 |
| 2012/0069389 | A1 | 3/2012 | Funatsu |
| 2012/0227102 | A1* | 9/2012 | Parla et al. ............... 726/15 |
| 2013/0050739 | A1 | 2/2013 | Oshima et al. |
| 2014/0104653 | A1 | 4/2014 | Moyer et al. |
| 2014/0122733 | A1 | 5/2014 | Kadota |
| 2014/0129674 | A1 | 5/2014 | Matsuda |
| 2014/0160522 | A1 | 6/2014 | Kawasaki |

OTHER PUBLICATIONS

Apr. 10, 2015—(US) Notice of Allowance—U.S. Appl. No. 14/068,518.
Dec. 2, 2014 (EP) Extended Search Report App. 13190932.7.
Dec. 4, 2014 (US) Notice of Allowance—U.S. Appl. No. 14/068,518.
Jul. 31, 2014 (US)—Non-Final Office Action received in U.S. Appl. No. 14/068,518.
Co-pending U.S. Appl. No. 14/068,146, filed Oct. 31, 2013.
Nov. 13, 2015—(US) Non-Final Office Action—U.S. Appl. No. 14/068,146.
Dec. 22, 2015—(CN) Office Action—App No. 201310364371.3 with English Translation.
Jan. 21, 2016—(CN) Notification of the First Office Action with Search Report—App 201310353873.6—Eng Tran.

* cited by examiner

NON-TRANSITORY MACHINE-READABLE MEDIUM AND COMMUNICATION RELAY APPARATUS

CROSS-REFERENCE TO RELATED APPLICATION

This application claims priority from Japanese Patent Application No. 2012-193177 filed on Sep. 3, 2012, which is incorporated herein by reference.

BACKGROUND

1. Technical Field

Aspects described herein relate to relaying of communication.

2. Description of the Related Art

A technology has been disclosed in which a configuration screen used to choose settings for an image processing apparatus is displayed on a web browser executed by a terminal device, the image processing apparatus having a web server function.

Moreover, the Internet Printing Protocol (IPP) is known. The IPP is a standard for connecting an image processing apparatus and a terminal device via the Internet and for making the image processing apparatus perform processing on an image through the Internet.

Moreover, a draft of the IPP over Universal Serial Bus (USB) protocol is known. The IPP over USB protocol is a standard for performing communication in accordance with the IPP described above in an environment in which an image processing apparatus and a terminal device are connected through a USB interface.

BRIEF SUMMARY

In general, multi-session communication is performed between a web browser and a web server function unit. Thus, in the case where a web browser displays a configuration screen through which settings for an image processing apparatus may be chosen, the web browser tries to perform multi-session communication with the web server function unit.

However, the USB protocol does not support multi-session communication. Thus, when the web browser tries to perform multi-session communication with the web server function unit in an environment in which the terminal device and the image processing apparatus are connected through a USB interface, confusion may occur such that a response for a session may be transmitted as a response for another session.

In the present application, various aspects of performing multi-session communication are described. In one example, a client application may perform multi-session communication with an image processing apparatus without the aforementioned confusion via a communication interface that does not support multi-session communication.

DETAILED DESCRIPTION

First Embodiment

A first embodiment will be described with reference to FIGS. 1 to 7.

(1) Electrical Structure of PC

First, an electrical structure of a PC 1, which is an information processing apparatus according to the first embodiment, will be described with reference to FIG. 1.

Figure 1:
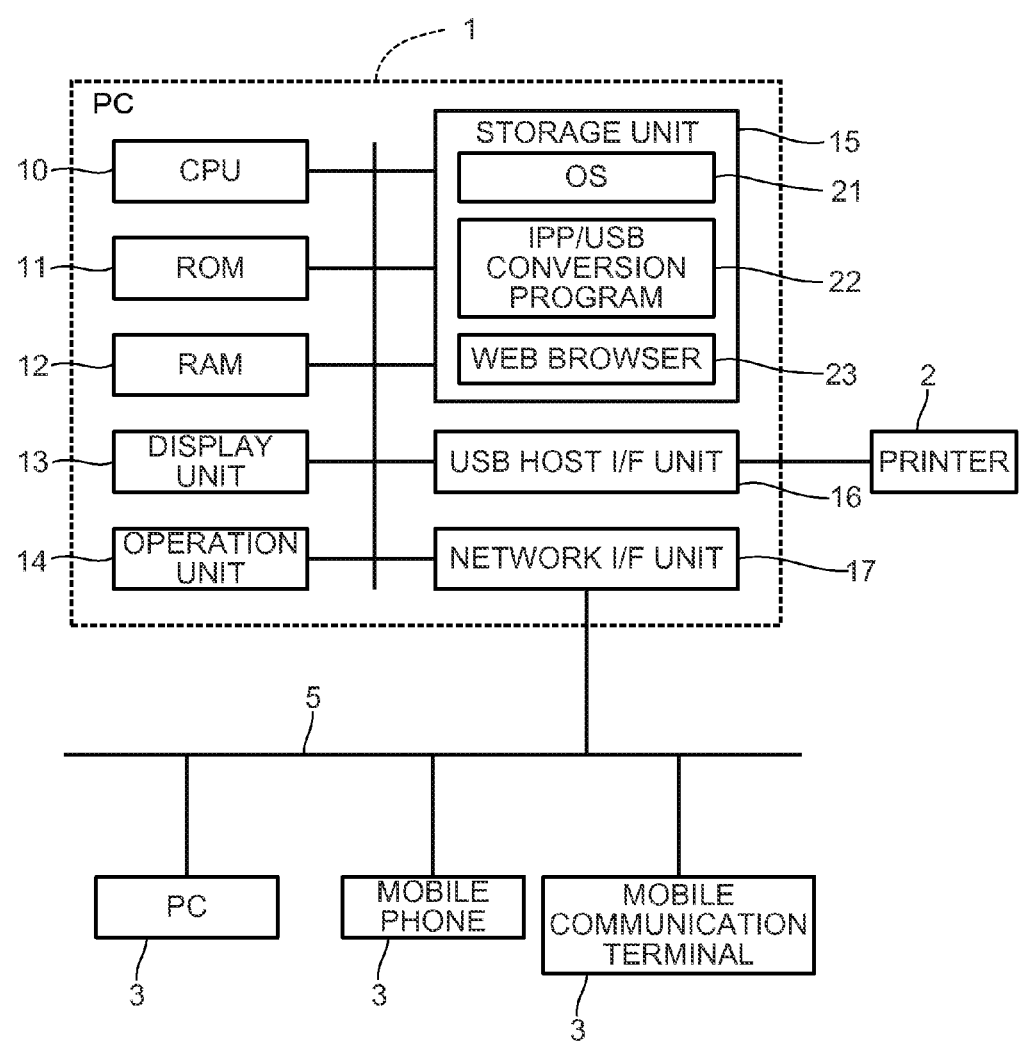
FIG. 1 is a block diagram illustrating a simplified electrical structure of a personal computer (PC) according to a first embodiment.

The PC 1 includes a central processing unit (CPU) 10, a read-only memory (ROM) 11, a random-access memory (RAM) 12, a display unit 13, an operation unit 14, a storage unit 15, a USB host interface unit 16 (represented as USB HOST I/F UNIT in FIG. 1), and a network interface unit 17 (represented as NETWORK I/F UNIT in FIG. 1).

The CPU 10 controls individual units of the PC 1 by executing programs stored in the ROM 11 or the storage unit 15. In the ROM 11, programs to be executed by the CPU 10 and data are stored. The RAM 12 is used as a main storage device for the CPU 10 to execute various types of processing. The CPU 10 is an example of a processing unit.

The display unit 13 includes a display device such as a liquid crystal display, a display driving circuit that drives the display device, and the like.

The operation unit 14 includes a keyboard, a mouse, and an interface to which the keyboard and the mouse are connected.

The storage unit 15 is a device in which various programs and data are stored by using a non-volatile memory such as a hard disk or a flash memory or other memories as known in the art. In the storage unit 15, an operating system (OS) 21, an IPP/USB conversion program 22, a web browser 23, and the like are stored.

The IPP/USB conversion program 22 is an example of a communication relay program. Moreover, the web browser 23 is an example of a client application that performs multi-session communication.

The USB host interface unit 16 includes a USB host controller, a jack to which a USB cable is connected, and the like. The USB host interface unit 16 is connected to a printer 2 via a USB cable in such a manner that the USB host interface unit 16 is capable of performing communication with the printer 2. A USB cable is an example of a communication line.

The network interface unit 17 is an interface used to perform communication with external communication terminals 3 such as PCs, mobile phones, or mobile communication terminals via a communication network 5 such as a local-area network (LAN) or the Internet. Note that the network interface unit 17 may be connected to the communication network 5 in a wired manner or in a wireless manner.

(2) Printer

The printer 2 illustrated in FIG. 1 is a printing device that prints images on sheets such as print sheets by using an electrophotography method, an ink jet method, or the like. The printer 2 is a USB printer class device. The printer 2 is an example of an image processing apparatus.

The printer 2 may understand a plurality of printer languages. A user is supposed to choose one of the printer languages in advance for the printer 2. Moreover, the printer 2 has first and second trays as trays in which sheets on which images are to be printed are stored. For each of the trays, a user is supposed to choose in advance the size of sheets to be stored in the tray, for the printer 2. Such settings may be chosen from the PC 1 via the USB cable. Further details are described below.

(3) Communication between PC and Printer

The PC 1 performs at least the following communication with the printer 2 via the USB cable:

Communication for choosing settings for the printer 2

Communication for transmitting print data to the printer 2.

Such communication is performed in accordance with the IPP over USB protocol. The IPP is Hypertext Transport Protocol (HTTP) based and is a protocol for performing communication with the printer 2 via a Transmission Control Protocol/Internet Protocol (TCP/IP) network such as the Internet or a LAN.

The IPP over USB protocol is a protocol to realize IPP communication over a USB interface. In accordance with the IPP over USB protocol, IPP communication data is packed in USB packets and the USB packets are transmitted or received.

(4) Program Configuration of PC and Functions of Printer

Figure 2:
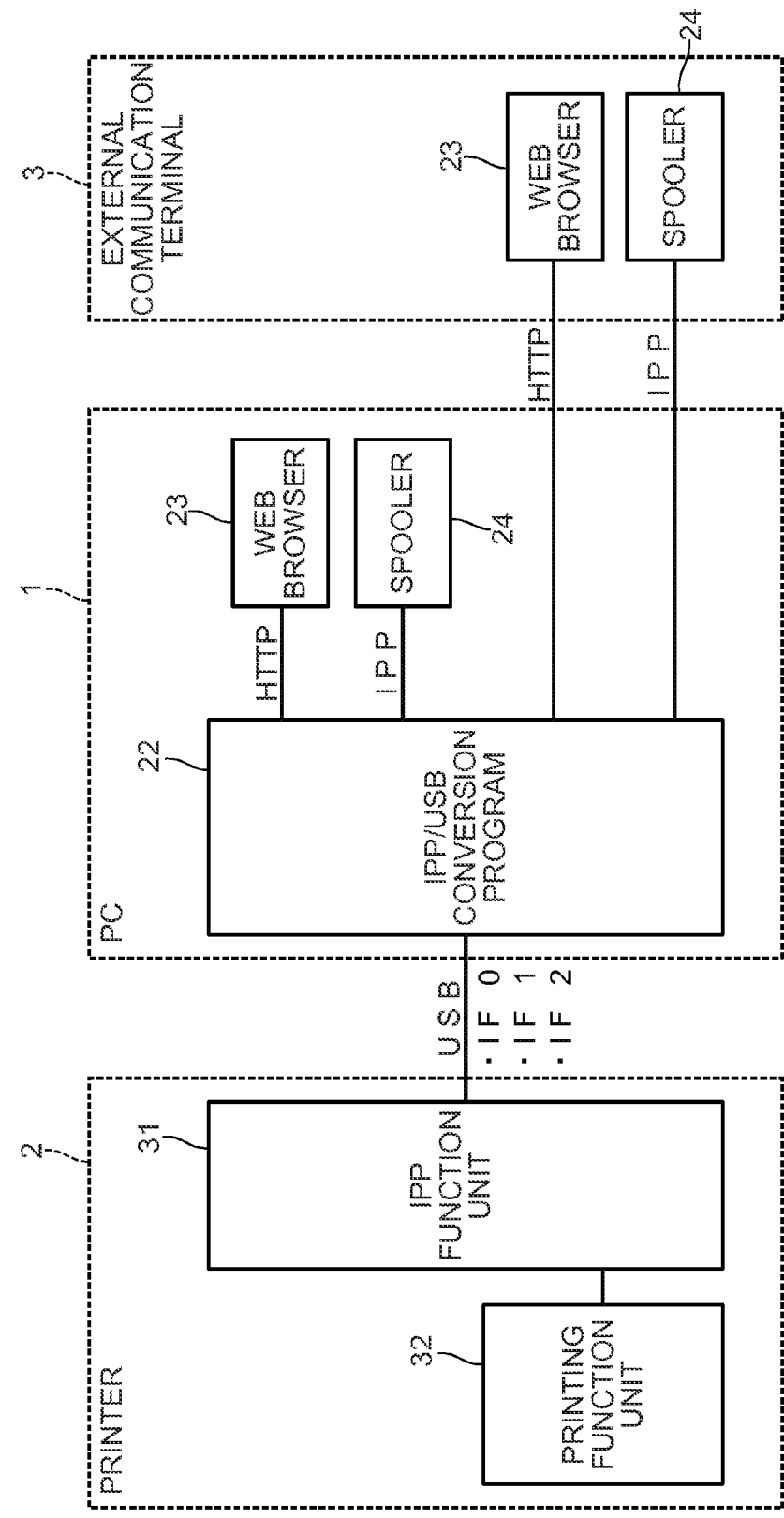
FIG. 2 is a block diagram illustrating a program configuration in the PC and function units of a printer.

Next, a program configuration of the PC 1 for performing communication in accordance with the IPP over USB protocol and function units of the printer 2 will be described with reference to FIG. 2.

First, the program configuration of the PC 1 will be described. The PC 1 executes the web browser 23, a spooler 24, and the IPP/USB conversion program 22.

The web browser 23 is a program used as a user interface for choosing settings for the printer 2. A commonly-used web browser may be used as the web browser 23.

The web browser 23 performs communication with the IPP/USB conversion program 22 in accordance with HTTP when the PC 1 and the printer 2 are connected via the USB cable. The IPP/USB conversion program 22 functions as a server for a specific port (hereinafter referred to as a port 80) of localhost (IP=127.0.0.1). The web browser 23 issues a request to the IPP/USB conversion program 22 and requests transmission of screen data of the printer 2 that is to be displayed on a configuration screen 41 (see FIG. 3), by accessing the port 80 of localhost (for example, http://127.0.0.1:80) from the IPP/USB conversion program 22.

Here, the screen data is written in Hypertext Markup Language (HTML) or in the eXtensible Markup Language (XML) or other known language.

The request transmitted to the IPP/USB conversion program 22 is transmitted by the IPP/USB conversion program 22 to an IPP function unit 31 of the printer 2 via the USB cable. The IPP function unit 31 executes IPP printing and a Common Gateway Interface (CGI) for a configuration screen. The IPP function unit 31 is the same as an existing IPP function unit except that the IPP function unit 31 inputs and outputs data via a USB cable instead of via a network. Thus, details of the IPP function unit 31 will be omitted here.

Note that the web browser 23 may be executed by the PC 1 or may be executed by an external communication terminal 3 that is connected to the PC 1 in such a manner that the external communication terminal 3 is capable of performing communication with the PC 1.

The spooler 24 is a program for spooling print data. The spooler 24 is provided as a part of the OS 21. When the PC 1 and the printer 2 are connected via the USB cable, the spooler 24 transmits print data to the IPP/USB conversion program 22 by performing communication with the IPP/USB conversion program 22 in accordance with the IPP.

The print data transmitted to the IPP/USB conversion program 22 is transmitted by the IPP/USB conversion program 22 to the IPP function unit 31 of the printer 2 via the USB cable.

The IPP/USB conversion program 22 is a program that relays communication between the web browser 23 and the IPP function unit 31 and between the spooler 24 and the IPP function unit 31. The IPP/USB conversion program 22 performs communication with the IPP function unit 31 via the USB cable. Details of the IPP/USB conversion program 22 will be described below.

Next, functions of the printer 2 will be described. The printer 2 has the IPP function unit 31 and a printing function unit 32.

The IPP function unit 31 has a web server function for choosing settings for the printer 2 from the web browser 23 and a function for outputting the print data received from the PC 1 to the printing function unit 32. The IPP function unit 31 realizes an example of web server functions.

The printing function unit 32 has a function for printing the print data output from the IPP function unit 31.

(5) Interfaces for USB Devices

Next, interfaces for USB devices will be described. In accordance with the USB protocol, one physical USB cable has one or more logical communication channels called interfaces.

In accordance with the USB protocol, USB devices must have a special endpoint called endpoint 0 for performing control transfer. Endpoint 0 is an endpoint that enables two-way communication. Interfaces are provided on the basis of interface descriptors obtained from the printer 2 through endpoint 0. Each of the interfaces generally has one or more endpoints.

The printer 2 according to the first embodiment has interfaces 1 and 2. Furthermore, the interfaces 1 and 2 have an endpoint for reading and an endpoint for writing, and enable two-way communication by using these endpoints.

Communication for choosing settings for the printer 2 is performed through the interface 1. Communication for transmitting print data to the printer 2 is performed through the interface 2.

Note that the interface 2 does not have to be provided and both communication for choosing settings for the printer 2 and communication for transmitting print data to the printer 2 may be performed through the interface 1.

(6) Issue of Case Where Multi-Session Communication is Performed via USB Cable

Next, an issue of a case where multi-session communication is performed via a USB cable will be described. Here, communication for choosing settings for the printer 2 from the PC 1 will be described as an example.

Here, a setting screen 41 of the printer 2 will be first described with reference to FIG. 3. On the setting screen 41, which is an example illustrated in FIG. 3, settings for a printer language 41*a*, a sheet size 41*b* of sheets set in the first tray, and a sheet size 41*c* of sheets set in the second tray may be chosen.

Figure 3:
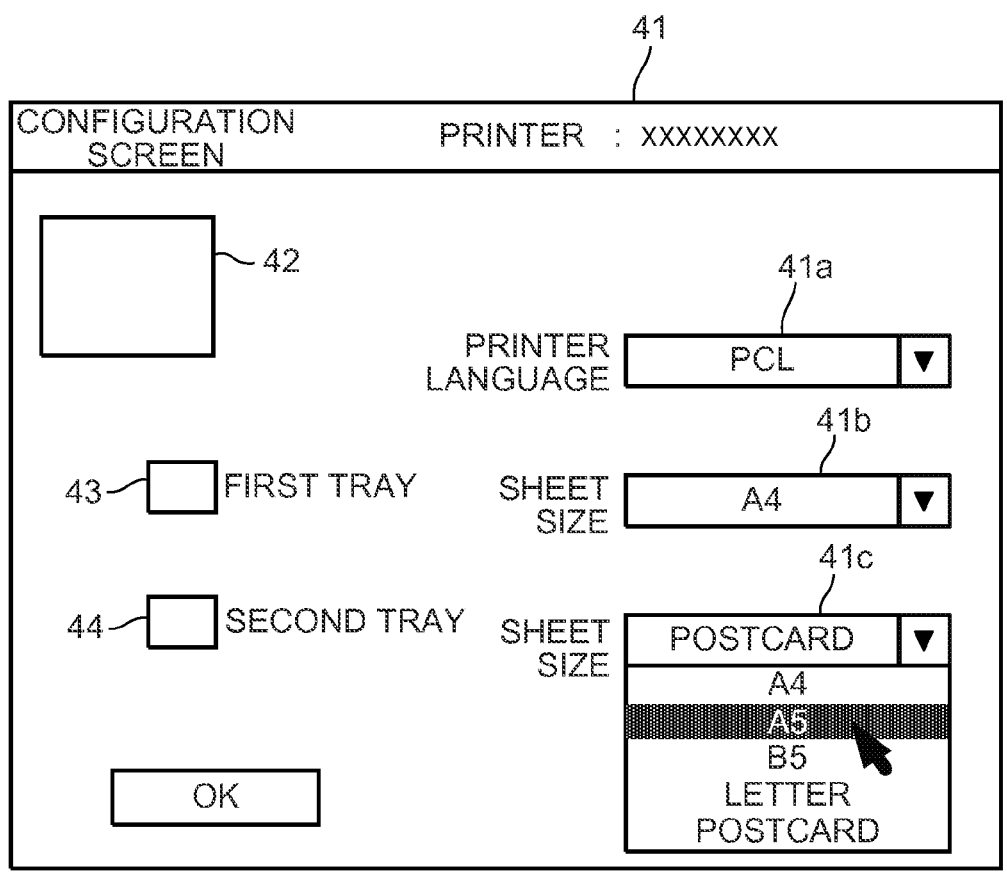
FIG. 3 is a schematic diagram illustrating an example of a configuration screen for the printer.

Moreover, as illustrated in FIG. 3, images 42, 43, and 44 are displayed on the configuration screen 41. The images 42 to 44 are called GIF1, GIF2, and GIF3, respectively. These images are not included in the screen data. Thus, after the web browser 23 has received the screen data, the web browser 23 requests transmission of these images from the IPP/USB conversion program 22.

That is, the configuration screen 41 is constituted by HTML or XML data generated by the IPP function unit 31 executing the CGI at the configuration screen 41.

When the web browser 23 accesses the specific port 80 (for example, http://127.0.0.1:80) of localhost, the web browser 23 establishes a session between the web browser 23 and the IPP/USB conversion program 22, the session being a session for issuing a GET command for obtaining a file of a main page. The GET command is transmitted to the printer 2 via the USB cable by the IPP/USB conversion program 22, and is processed by the CGI of the IPP function unit 31. As a response to this, the main page constituted by HTML/XML data to be displayed on the configuration screen 41 is returned via the USB cable. The main page constituted by HTML/XML data is further returned, as a response to the GET command, by the IPP/USB conversion program 22 to the web browser 23.

The web browser 23 analyzes the main page constituted by HTML/XML data and requests likewise items that are needed (such as the images GIF 1, GIF 2, and GIF 3) for the main page to be displayed, from the IPP/USB conversion program 22.

The web browser 23 may perform multi-session communication. Thus, in this case, for each of the items that are needed (such as the images GIF 1, GIF 2, and GIF 3) for the main page to be displayed, the web browser 23 establishes a session and requests transmission of the item, which is an image. That is, a GET command for obtaining the image GIF 1 is first transmitted, and then successively GET commands for obtaining the images GIF 2 and GIF 3 are transmitted without waiting for a response to the GET command for obtaining the image GIF 1. However, USB interfaces do not support multi-session communication. Moreover, the IPP function unit 31 does not always return the requested items in the order of GET commands received. The order in which the requested items are transmitted is undefined. Thus, when communication is performed for requests issued for performing communication through a plurality of sessions through the interface 1, confusion may occur such that a response for one of the sessions is transmitted as a response for another one of the sessions.

Specifically, information used to identify a session is not added to a response transmitted from the IPP function unit 31 to the IPP/USB conversion program 22. Thus, in the case where communication is performed for sessions through the interface 1, when the IPP/USB conversion program 22 receives a response from the IPP function unit 31, the IPP/USB conversion program 22 is unable to determine which session the response corresponds to. Thus, confusion may occur such that a response for a session is transmitted as a response for another session.

Hence the IPP/USB conversion program 22 according to the first embodiment relays communication through only one session at a time by executing an exclusive process.

Figure 4:
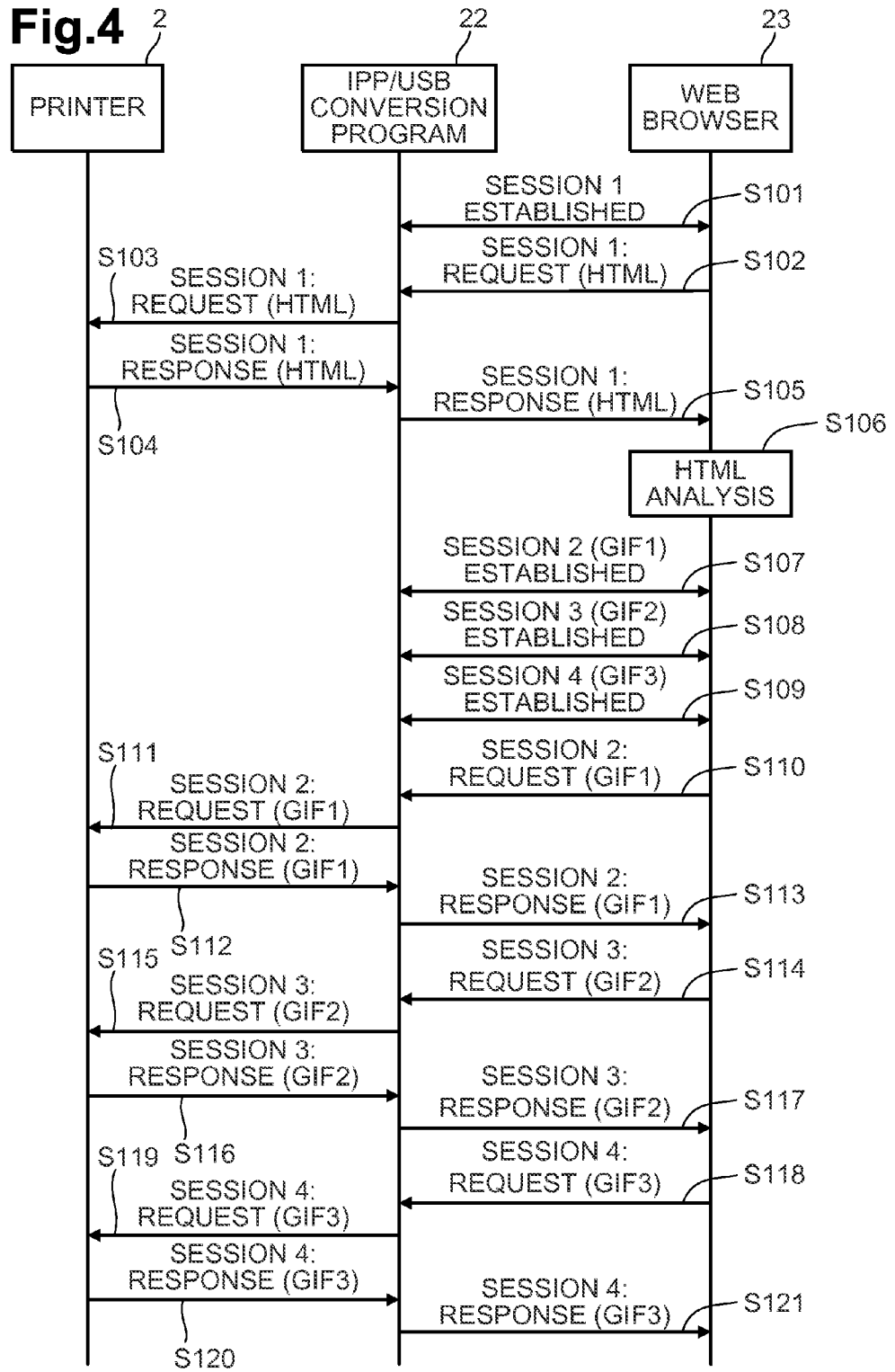
FIG. 4 is a sequence chart illustrating the overall flow of communication relay processing.

(7) Overall Flow of Communication Relay Processing Performed by IPP/USB Conversion Program The overall flow of communication relay processing performed by the IPP/USB conversion program 22 will be described with reference to FIG. 4. Here, communication for choosing settings for the printer 2 from the PC 1 will be described as an example. As described above, communication for choosing settings for the printer 2 is performed through the interface 1.

Hereinafter, the web browser 23 means the CPU 10 executing the web browser 23 and the IPP/USB conversion program 22 means the CPU 10 executing the IPP/USB conversion program 22.

The IPP/USB conversion program 22 is resident as a TCP server program for http://127.0.0.1:80.

When an address (http://127.0.0.1:80) of the configuration screen 41 is input by a user, the web browser 23 establishes a session 1 of a network between the web browser 23 and the IPP/USB conversion program 22 (in step S101). The web browser 23 transmits a GET command for requesting transmission of data of a main page of screen data (hereinafter simply referred to as main-page data) through the session 1 to the IPP/USB conversion program 22 (in step S102). Note that it is assumed that the network described here is a pseudo network established in a single PC 1.

When the IPP/USB conversion program 22 receives the GET command for requesting the main-page data, the IPP/USB conversion program 22 transfers the GET command to the IPP function unit 31 of the printer 2 via the USB cable (in step S103).

When the IPP function unit 31 receives the GET command, the IPP function unit 31 transmits the main-page data to the IPP/USB conversion program 22 (in step S104).

When the IPP/USB conversion program 22 receives the main-page data from the IPP function unit 31, the IPP/USB conversion program 22 transfers the main-page data to the web browser 23 via the network (in step S105).

When the web browser 23 receives the main-page data, the web browser 23 analyzes the main-page data (in step S106). The main-page data includes information regarding images GIF 1, GIF 2, and GIF 3 that are needed to display the configuration screen 41. Consequently, the web browser 23 establishes a new session between the web browser 23 and the IPP/USB conversion program 22 in order to obtain the images GIF 1, GIF 2, and GIF 3 and requests transmission of the images GIF 1, GIF 2, and GIF 3.

In this case, for each of the images GIF 1, GIF 2, and GIF 3, the web browser 23 establishes a session by using multi-session communication and requests transmission of the image. Thus, in the case of the configuration screen 41 illustrated in FIG. 3, three sessions such as a session 2 for requesting transmission of the image GIF 1 (in step S107), a session 3 for requesting transmission of the image GIF 2 (in step S108), and a session 4 for requesting transmission of the image GIF 3 (in step S109) are established as illustrated in FIG. 4. Here, it is assumed that the sessions 2 to 4 are established in this order.

In this case, when the IPP/USB conversion program 22 establishes the session 2, which is the first session among the three sessions, the IPP/USB conversion program 22 prohibits communication through sessions other than the session 2. Then, the IPP/USB conversion program 22 relays communication between the web browser 23 and the IPP function unit 31 through the session 2 (in steps S110 to S113).

Then, when relaying of communication through the session 2 is completed, the IPP/USB conversion program 22 permits communication through the session 3. That is, communication through the session 4 is still prohibited.

Then, the IPP/USB conversion program 22 relays communication between the web browser 23 and the IPP function unit 31 through the session 3 (in steps S114 to S117). When relaying of communication through the session 3 is completed, the IPP/USB conversion program 22 permits communication through the session 4.

Then, the IPP/USB conversion program 22 relays communication between the web browser 23 and the IPP function unit 31 through the session 4 (in steps S118 to S121).

By performing this series of processing procedures, the main page of the configuration screen 41 and the images GIF 1, GIF 2, and GIF 3 used in the main page are read by the web browser 23 and the web browser 23 displays the configuration screen 41. An operation input through the configuration screen 41 is converted into a GET command, a POST command, or the like according to the HTTP protocol and transmitted to the IPP function unit 31 likewise via the IPP/USB conversion program 22. By performing this series of processing procedures, the settings for the printer 2 may be chosen via a USB cable in the same or similar procedures as in that the CGI of the IPP function unit 31 is accessed via an existing network.

Figure 5:
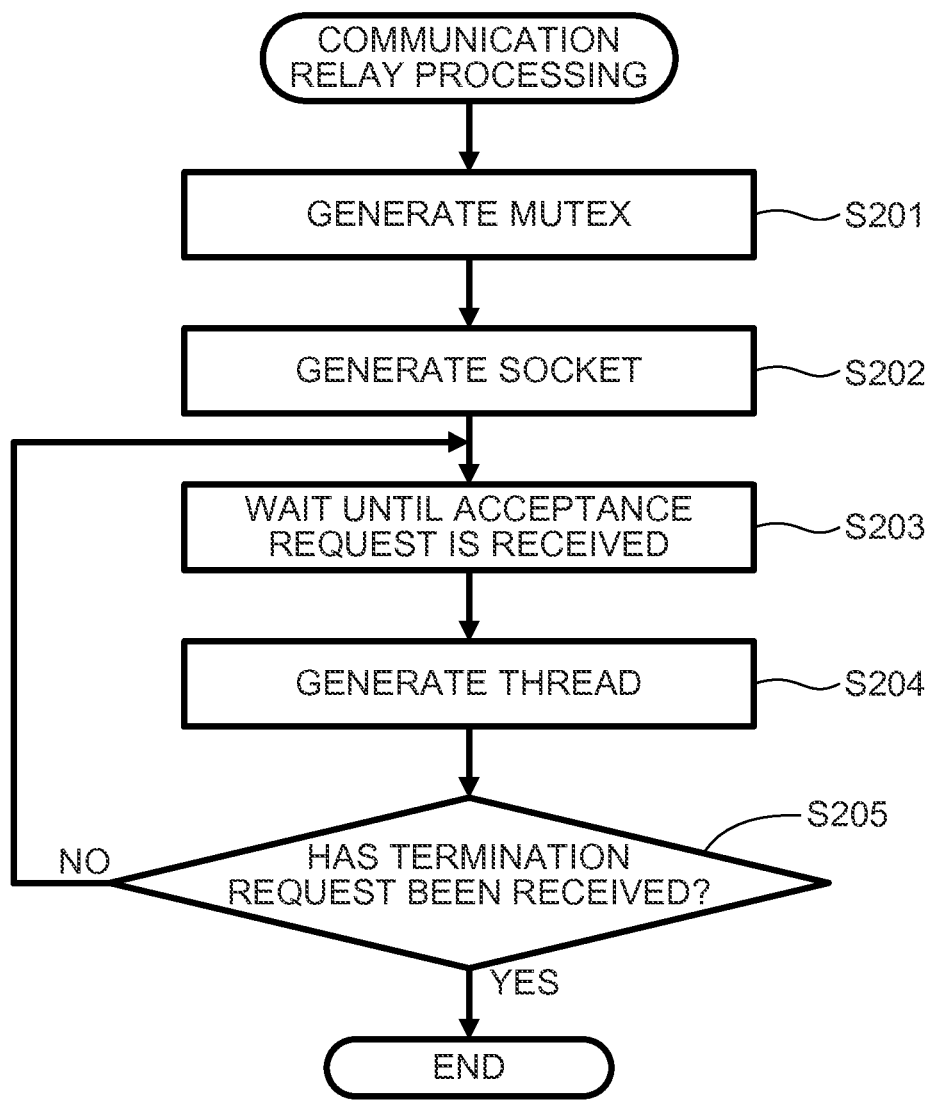
FIG. 5 is a flowchart of the communication relay processing.

(8) Details of Communication Relay Processing Performed by IPP/USB Conversion Program Next, the above-described communication relay processing will be more specifically described with reference to FIG. 5. The IPP/USB conversion program 22 is executed as a resident program. The present processing is started as a resident program when the PC 1 is turned on.

Here, the present processing is processing for relaying communication between the web browser 23 and the IPP function unit 31. Processing for relaying communication between the spooler 24 and the IPP function unit 31 is executed as processing that is different from the present processing. The description of the processing that is different from the present processing is omitted.

In step S201, the IPP/USB conversion program 22 generates a Mutex for executing an exclusive process. A Mutex is a system for performing an exclusive process, the system being provided in a programming language. Details of a Mutex will be described later. The Mutex is deleted when the Mutex is not necessary.

Note that a case where an exclusive process is performed by using the Mutex is described here as an example; however, the way in which an exclusive process is performed is not limited thereto. For example, a semaphore may be used, or an original method may be used without using a Mutex or a semaphore.

In step S202, the IPP/USB conversion program 22 generates a socket and performs setting of the socket, the socket monitoring a request for establishing a session (the request is called an acceptance request). A socket is a simplified interface for performing communication in accordance with the TCP/IP protocol. Moreover, "setting of the socket" refers to setting of the IP address, port number, and the like of the PC 1 for the socket and also refers to setting of the operation mode of the socket to a monitoring mode of an acceptance request. In the first embodiment, the IP address 127.0.0.1 of the port 80 is monitored.

When a user starts the web browser 23 and sets the IP address to 127.0.0.1 and the port to port 80, the web browser 23 starts to establish a connection to the IP address and the port so as to perform communication. This processing is an acceptance request.

In step S203, the IPP/USB conversion program 22 waits until the IPP/USB conversion program 22 receives an acceptance request from the web browser 23. When the IPP/USB conversion program 22 receives an acceptance request, the procedure proceeds to step S204.

In step S204, the IPP/USB conversion program 22 generates a thread.

In step s205, the IPP/USB conversion program 22 determines whether or not a termination request has been issued from the OS 21. When the termination request has been issued, the IPP/USB conversion program 22 ends the present processing. When the termination request has not been issued, the procedure returns to step S203 and the processing is repeated.

(9) Processing Executed by Thread

Figure 6:
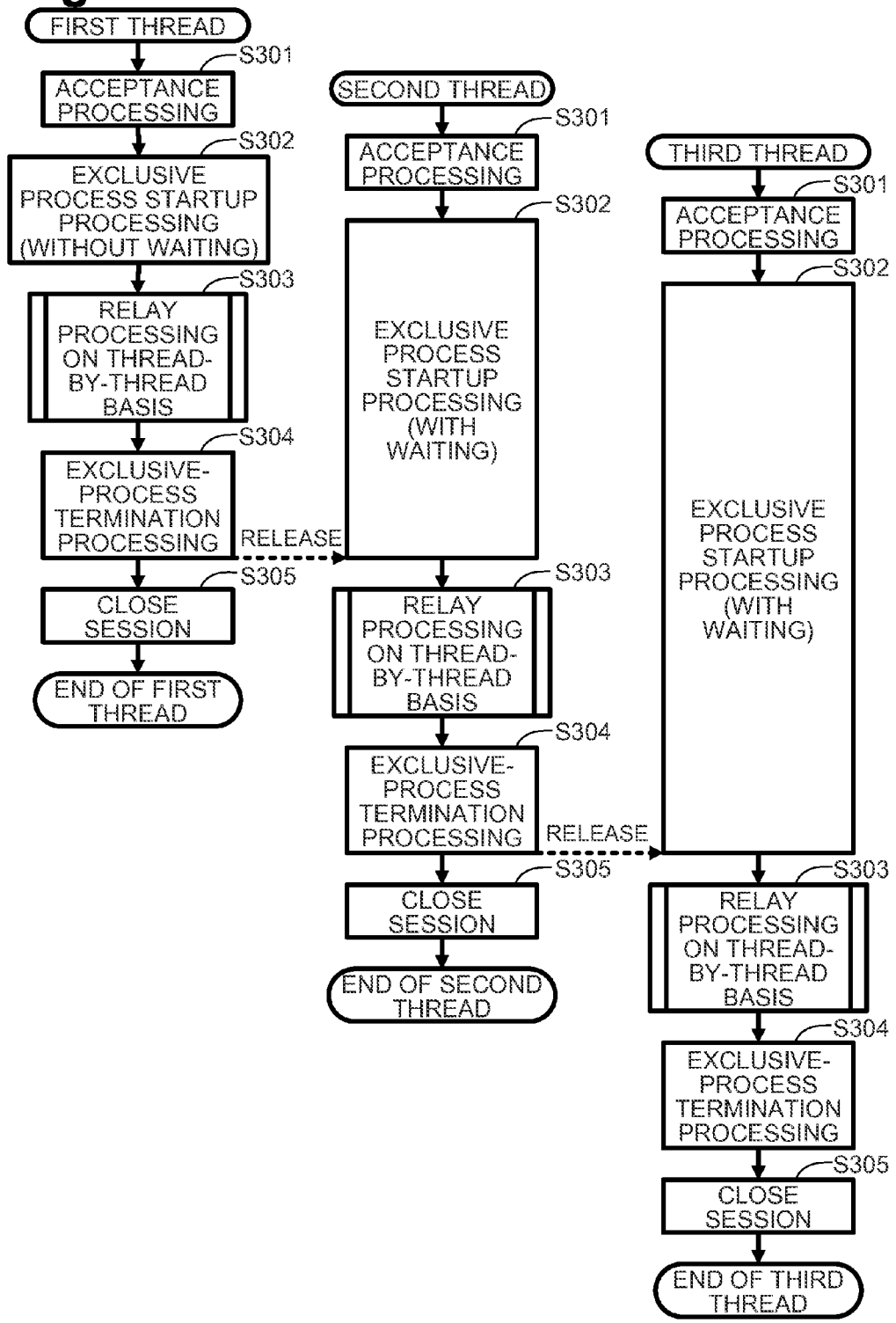
FIG. 6 includes flowcharts of processing performed on a thread-by-thread basis.
Figure 7:
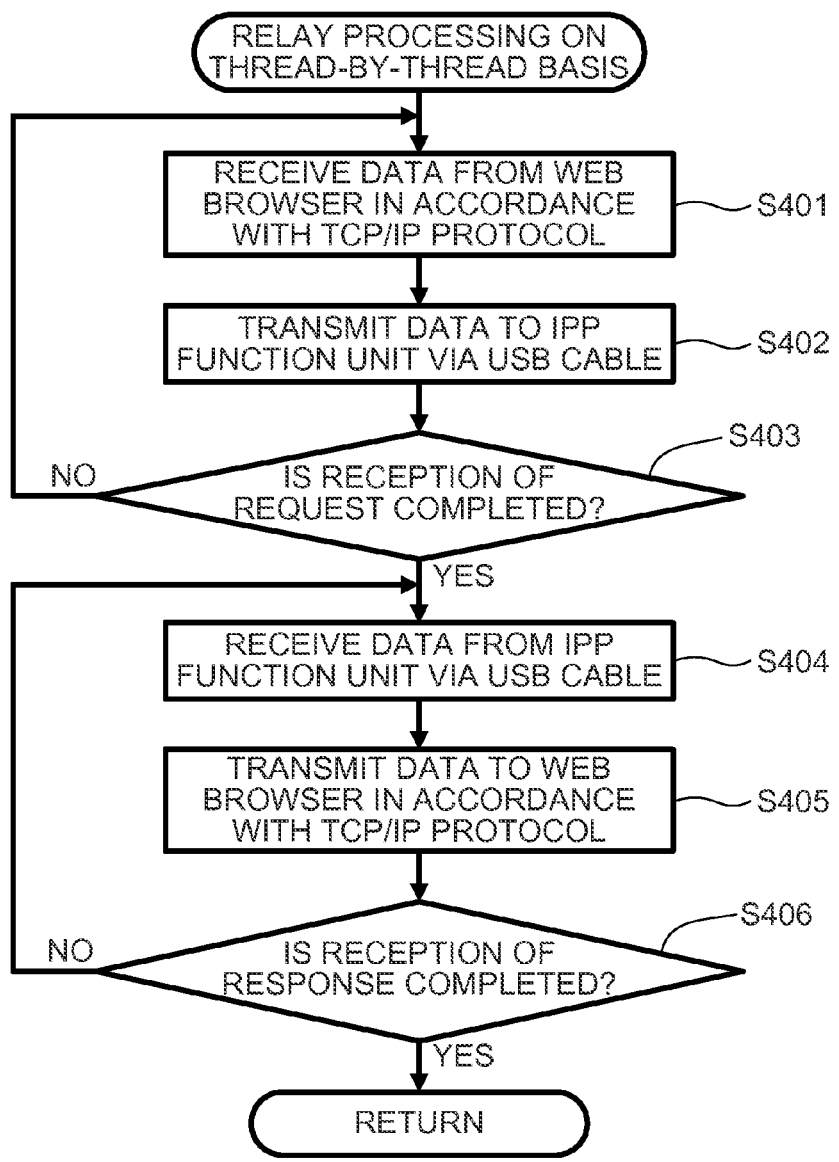
FIG. 7 is a flowchart of relay processing performed on a thread-by-thread basis.

Next, processing to be executed by the thread generated in step S204 will be described with reference to FIG. 6. As described above, a thread is generated every time an acceptance request is received. Processing to be executed does not differ from thread to thread, and thus, here as an example, the processing to be executed will be described using a first thread that is first generated.

In step S301, the first thread executes acceptance processing. Acceptance processing is processing for establishing a new session for a program that has transmitted an acceptance request, that is, a program that has transmitted a request to establish a session. When a session is established, a new socket is generated to perform communication through the session. In another example, information may be transmitted to the printer 2 by performing control transfer in which endpoint 0 of a USB device is used, at a timing at which the socket is opened, closed, or accepted, and synchronization with the printer 2 may be achieved at the timing at which the socket is opened, closed, or accepted. Step S301 is an example of establishment processing in which a new session is established for the web browser 23.

In step S302, the first thread executes an exclusive-process startup processing in which communication through sessions other than the new session established in step S301 is prohibited.

Specifically, the first thread tries to obtain the Mutex generated in step S201. In the case where the Mutex is not obtained by another thread, the first thread obtains the Mutex. The other threads that try to obtain the Mutex later are in the state of waiting until the first thread releases the Mutex. That is, the other threads are in a state in which communication is prohibited.

In contrast, in the case where the Mutex is obtained by another thread, the first thread is in the state of waiting until the other thread releases the Mutex. That is, the first thread is in the state in which communication is prohibited. Then, when the other thread releases the Mutex, if there is another thread that has entered the state of waiting prior to the first thread, the other thread that has entered the state of waiting prior to the first thread obtains the Mutex and the first thread is still in the state of waiting. If there is no thread that has entered the state of waiting prior to the first thread, the first thread obtains the Mutex.

When the first thread obtains the Mutex, the procedure proceeds to step S303.

Here, step S302 is an example of determination processing, an example of waiting processing, and an example of an exclusive process. That is, the first thread executes determination processing, waiting processing, and an exclusive process by using a system of a Mutex.

In step S303, the first thread executes relay processing, which is performed on a thread-by-thread basis. The relay processing performed on the thread-by-thread basis is processing in which communication is relayed between the web browser 23 and the IPP function unit 31 through the new session established in step S301. Details of the relay processing performed on the thread-by-thread basis will be described later.

In step S304, the first thread executes exclusive-process termination processing. Specifically, the first thread releases the Mutex. Step S304 is an example of permission processing.

In step S305, the first thread closes the session generated in step S301 and terminates the processing thereof.

(10) Relay Processing Performed on Thread-by-Thread Basis

Next, relay processing executed in step S303 and performed on the thread-by-thread basis will be described.

Here, a request transmitted from the web browser 23 to the IPP/USB conversion program 22 and a response transmitted from the IPP function unit 31 to the IPP/USB conversion program 22 are first described.

The request transmitted from the web browser 23 to the IPP/USB conversion program 22 includes one or more pieces of communication data. In the following, an example of such request is shown. Here, line number is shown in brackets before each piece of communication data.

[line 1] POST/ipp/[function] HTTP/1.1<CRLF>
[line 2] Host: localhost<CRLF>
[line 3] Content-Type: application/ipp/<CRLF>
[line 4] Transfer-Encoding: chunked<CRLF>
[line 5] <CRLF>

In the above-described example, each line represents one piece of communication data. Moreover, as is clear from the above-described example, the end of each piece of communication data is <CRLF>, which is a carriage return line feed code.

Moreover, the last piece of communication data of the request is only <CRLF> as shown in line 5. Thus, when the received piece of communication data is only <CRLF>, it is determined that reception of one request is completed.

Note that, in a PUT command and a POST command, binary data or text data is usually transmitted in addition to these pieces of communication data. In this case, a line such as "Content-Length: 4554" is inserted in these pieces of communication data, and it indicates that additional data having a specified number of bytes (4554 in this case) follows.

Moreover, in the case where the number of bytes of all additional data is unknown, there may be a case where a line such as "Transfer-Encoding: chunked" is inserted and it indicates that small blocks of data follow. In this case, the size of each block of data is shown.

Similarly, one response transmitted from the IPP function unit 31 to the IPP/USB conversion program 22 includes one or more pieces of communication data, and the last piece of communication data is only <CRLF>. Moreover, in a response corresponding to a GET command, binary data is likewise transmitted in addition to these pieces of communication data. Techniques described in any of the above-described cases are commonly used, and thus detailed description thereof will be omitted here.

In step S401, the first thread receives communication data from the web browser 23 through the session established in step S301.

In step S402, the first thread transmits the communication data received in step S401 from the web browser 23 to the IPP function unit 31 via the USB cable.

In step S403, the first thread determines whether or not reception of one request is completed.

Specifically, the first thread determines the end of data (the request) by analyzing a reception state of <CRLF>, Content-Length, Transfer-Encoding: chunked, and the like, in accordance with the HTTP protocol. Specifically, the end of data (the request) may be determined by checking whether or not there is <CRLF> and by checking the size of additional data indicated by Content-Length or Transfer-Encoding: chunked.

As a result, when it is determined that transferring of all request data and additional data is completed that are supposed to be transmitted through the session from the web browser 23 to the IPP function unit 31, the procedure proceeds to step S404. In contrast, when it is determined that reception of the communication data from the web browser 23 has not yet been completed, it is determined that the first thread has not yet finished receiving one request. Then, the procedure returns to step S401 and the processing is repeated. Step S403 is an example of first analysis processing. The transferred request data and additional data are analyzed by using the configuration-screen CGI of the IPP function unit 31, and the IPP function unit 31 generates response data corresponding to the transferred request data and additional data. For example, a response corresponding to a GET command for requesting main-page data is a series of pieces of information that includes the main page. The data of the response is returned to the IPP/USB conversion program 22 via the USB cable.

In step S404, as a response corresponding to the request transmitted to the IPP function unit 31, the first thread receives communication data from the IPP function unit 31 via the USB cable.

In step S405, the first thread transmits the communication data received from the printer 2 in step S404 to the web browser 23 through the session established in step S301.

In step S406, the first thread determines whether or not reception of one response is completed.

The determination procedures are the same as those or similar to those performed in step S403. When it is determined that reception of one response is completed, the present processing ends. In contrast, when it is determined that reception of one response has not yet been completed, the procedure returns to step S404 and the processing is repeated. Step S406 is an example of second analysis processing.

The same communication as or similar communication to that described above is performed also for the second thread. However, in this case, the second thread is in the state of waiting due to the exclusive-process startup processing performed in step S302 until execution of the exclusive-process termination processing performed in step S304 is completed for the first thread.

Similarly, the third thread is in the state of waiting until execution of the exclusive-process termination processing performed in step S304 is completed for the first and second threads.

For all the threads, the relay processing of step S303 is performed. That is, the relay processing of step S303 is guaranteed not to be performed for a plurality of threads simultaneously.

(11) Effects of First Embodiment

There is a case where multi-session communication is performed between the web browser 23 and the printer 2 via a USB cable (in other words, a USB interface), which is a communication interface that does not support multi-session communication. In this case, when the above-described IPP/USB conversion program 22 is used, confusion such that a response for one session is transmitted as a response for another session may be prevented. This is because, in the first embodiment, when communication is being relayed through one session, communication through other sessions is prohibited.

Thus, when the IPP/USB conversion program 22 is used, multi-session communication may be performed without confusion between the web browser 23 and the printer 2 via a USB cable.

Furthermore, when the IPP/USB conversion program 22 is used and communication through one session is performed, communication through another session is permitted upon completion of relay processing for a pair of a request and its response. Thus, waiting time for the other sessions may be shortened.

Furthermore, when the IPP/USB conversion program 22 is used, communication data that is received and transmitted between the web browser 23 and the IPP function unit 31 is relayed. Thus, multi-session communication between the web browser 23 and the IPP function unit 31 may be performed without confusion via a USB cable.

Furthermore, when the IPP/USB conversion program 22 is used, communication is relayed to choose the settings for the printer 2 from the web browser 23. Thus, in the case where the settings for the printer 2 are chosen from the web browser 23, multi-session communication may be performed without confusion.

Furthermore, when the IPP/USB conversion program 22 is used, whether reception of the communication data from the web browser 23 is completed is determined by analyzing the communication data received from the web browser 23. Thus, it may be determined whether or not reception of a request is completed. The same or similar processing procedures may be performed for a response received from the IPP function unit 31.

Second Embodiment

Figure 8:
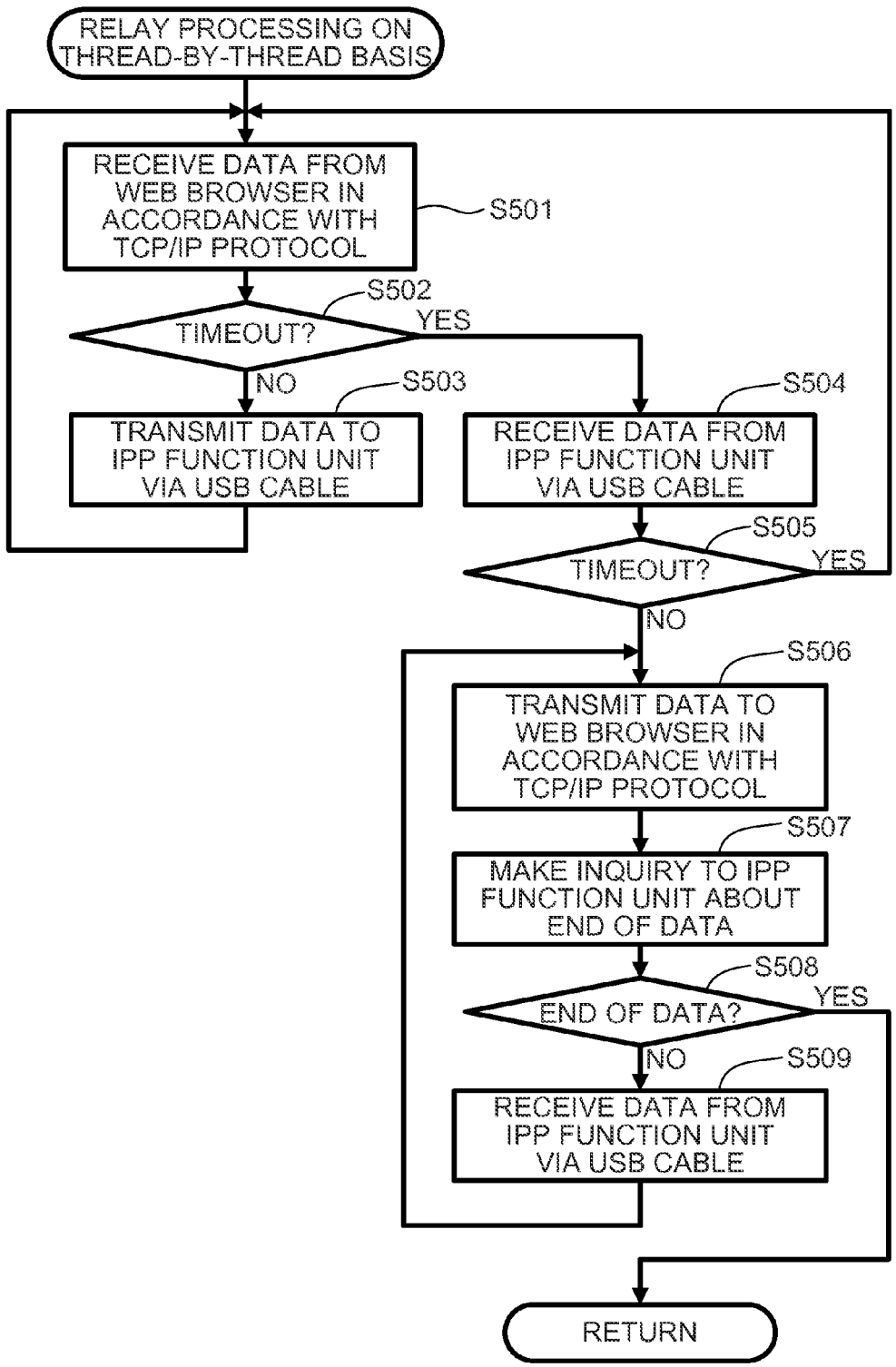
FIG. 8 is a flowchart of relay processing that each of the threads executes, according to a second embodiment.

Next, a second embodiment will be described with reference to FIG. 8.

The second embodiment is a modified example of the relay processing performed on the thread-by-thread basis in the first embodiment. In the relay processing according to the first embodiment, the relay processing being performed on the thread-by-thread basis, it is determined whether or not reception of a request is completed and whether or not reception of a response is completed, by analyzing communication data. In contrast, in relay processing according to the second embodiment, it is determined whether or not reception of a request is completed and whether or not reception of a response is completed, without analyzing communication data.

The relay processing according to the second embodiment, the relay processing being performed on the thread-by-thread basis, will be described with reference to FIG. 8.

In step S501, the first thread receives communication data from the web browser 23.

Specifically, the first thread makes an inquiry to the socket generated in step S301 as to whether there is communication data. When there is communication data received from the web browser 23, the first thread receives the communication data and the procedure proceeds to step S502. In contrast, when there is no communication data received from the web browser 23, a timeout occurs for the first thread after a first predetermined time has elapsed and the procedure proceeds to step S502.

In step S502, the first thread determines whether or not a timeout has occurred in step S501. If NO in step S502, the procedure proceeds to step S503. If YES in step S502, the first thread determines that reception of a request is completed and the procedure proceeds to step S504.

In step S503, the first thread transfers the communication data received from the web browser 23 in step S501 to the IPP function unit 31 via the USB cable. The communication data is processed by using the configuration-screen CGI of the IPP function unit 31, and a response corresponding to the command is returned.

In step S504, the first thread receives communication data from the IPP function unit 31 via the USB cable. The communication data is data received as a response corresponding to the request transmitted to the IPP function unit 31 in steps S501 to S503.

Here, in the case where the first thread does not receive communication data from the IPP function unit 31 within a second predetermined time after the first thread has transmitted the last communication data to the IPP function unit 31, a timeout occurs for reception of communication data from the IPP function unit 31.

In step S505, the first thread determines whether or not a timeout has occurred for reception of the communication data from the IPP function unit 31 in step S504. The reason why such a determination is performed will be described below.

As described above, when it is determined that a timeout has occurred in step S502, the first thread determines that reception of the request from the web browser 23 is completed. However, there may be a case in which reception of the request has not yet actually been completed and transmission of the communication data is merely delayed for some reason such that the CPU 10 has a high load.

When the first thread has not yet completed reception of the request from the web browser 23, transmission of the request from the first thread to the IPP function unit 31 has not yet also been completed. Thus, the IPP function unit 31 is in a state in which the IPP function unit 31 is waiting for reception of the request to be completed. That is, the IPP function unit 31 does not transmit a response to the first thread.

As a result, even though reception of the request from the web browser 23 has not yet been completed, when it is determined that a timeout has occurred in steps S502, a timeout occurs in step S504 for reception of communication data from the IPP function unit 31.

Thus, by determining whether or not a timeout has occurred for reception of communication data from the IPP function unit 31, it may be determined with high accuracy whether a timeout that has occurred in step S502 is a true timeout resulted upon completion of reception of the request from the web browser 23 or a false timeout that has occurred even though reception of the request from the web browser 23 has not yet been completed.

For the first thread, when a timeout has not occurred in step S505 for reception of communication data from the IPP function unit 31, the procedure proceeds to step S506. In contrast, when a timeout has occurred in step S505 for reception of communication data from the IPP function unit 31, the first thread determines that the timeout in step S502 is the false timeout and the procedure returns to step S501 so as to receive the rest of the communication data from the web browser 23.

In step S506, the first thread transmits the communication data received from the printer 2 to the web browser 23.

In step S507, the first thread makes an inquiry to the IPP function unit 31 as to whether transmission of the response has been completed. This inquiry is made by performing control transfer in which endpoint 0 is used.

In step S508, the first thread makes a determination in accordance with a reply from the printer 2, the reply corresponding to the inquiry made in step S507. When the reply indicates that the transmission of the response has been completed (the reply indicating the end of data of the response), the first thread determines that relaying of communication has been completed and ends the present processing. The procedure returns to processing performed for the thread. In contrast, when the reply indicates that the transmission of the response has not yet been completed, the first thread determines that relaying of communication has not yet been completed. Then, the procedure proceeds to step S509.

In step S509, the first thread receives the communication data from the IPP function unit 31 via the USB cable. Then, the procedure returns to step S506 again, and the communication data is transmitted to the web browser 23. Thereafter, steps S506 to 509 are repeatedly performed until the end of the data of the response is obtained, that is, the entirety of the response from the IPP function unit 31 is transferred to the web browser 23.

When the IPP/USB conversion program 22 according to the second embodiment and described above is used, in the case where the communication data is not received for the first predetermined time or longer from the web browser 23, it is provisionally determined that reception of a request from the web browser 23 has been completed. Thus, whether or not reception of the request has been completed may be determined without analyzing the content of the communication data.

Moreover, when the IPP/USB conversion program 22 is used, in the case where communication data is not received from the IPP function unit 31 within the second predetermined time, it is determined that a provisional determination that reception of a request has been completed is wrong, and the rest of the communication data is received from the web browser 23. Thus, the request from the web browser 23 may be more assuredly received.

Furthermore, when the IPP/USB conversion program 22 is used, in the case where an inquiry is made to the IPP function unit 31 as to whether transmission of a response has been completed and a reply corresponding to the inquiry is received, the replay indicating that transmission of the response has been completed, it is determined that relaying of communication has been completed. Thus, whether or not relaying of communication has been completed may be determined without analyzing the content of communication data.

Third Embodiment

Next, a third embodiment will be described with reference to FIG. 9.

As described above, in the IPP/USB conversion program 22 according to the first embodiment, when transmission and reception of a pair of a request and a response are completed through a session, the session is closed. In contrast, in the IPP/USB conversion program 22 according to the third embodiment, a plurality of pairs of a request and a response are transmitted and received through a session.

Figure 9:
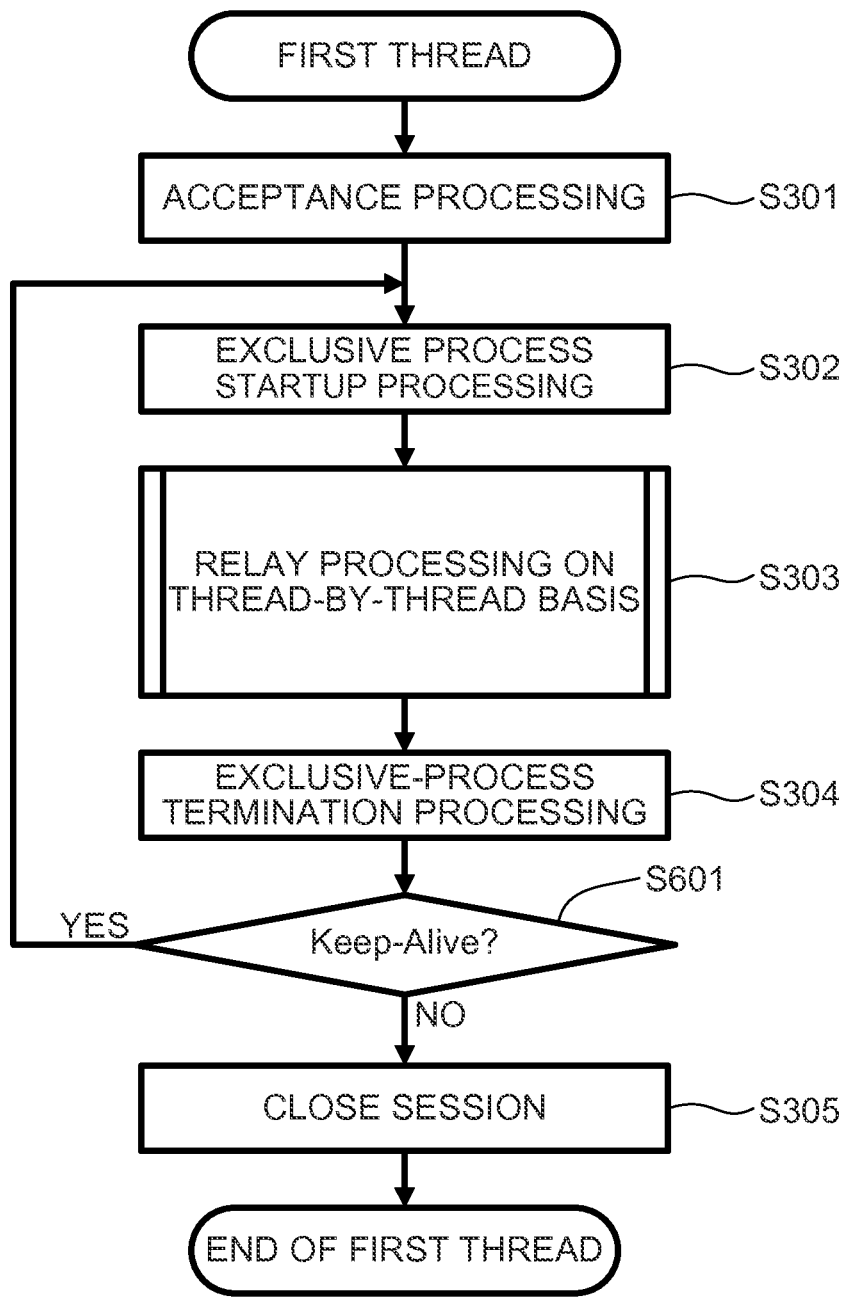
FIG. 9 is a flowchart of processing that a thread executes, according to a third embodiment.

FIG. 9 is a flowchart illustrating the flow of processing procedures for the first thread according to the third embodiment.

Steps S301 to S304 are the same as those in the first embodiment, and thus the description thereof is omitted.

In step S601, the first thread determines whether a keep-alive signal has been received within a third predetermined time after the exclusive-process termination processing has been completed in step S304. In the case where the keep-alive signal has been received, the procedure returns to step S302. In the case where the keep-alive signal has not been received, the procedure proceeds to step S305 and the session is closed.

Here, the keep-alive signal is a signal that is sent to keep a session. The keep-alive signal is transmitted by the web browser 23. The keep-alive signal is an example of a keeping signal. The keep-alive signal is defined by the HTTP 1.1.

When the IPP/USB conversion program 22 according to the third embodiment and described above is used, a session is not closed every time a pair of a request and a response is transmitted and received. Thus, communication may be effectively performed.

Fourth Embodiment

Figure 10:
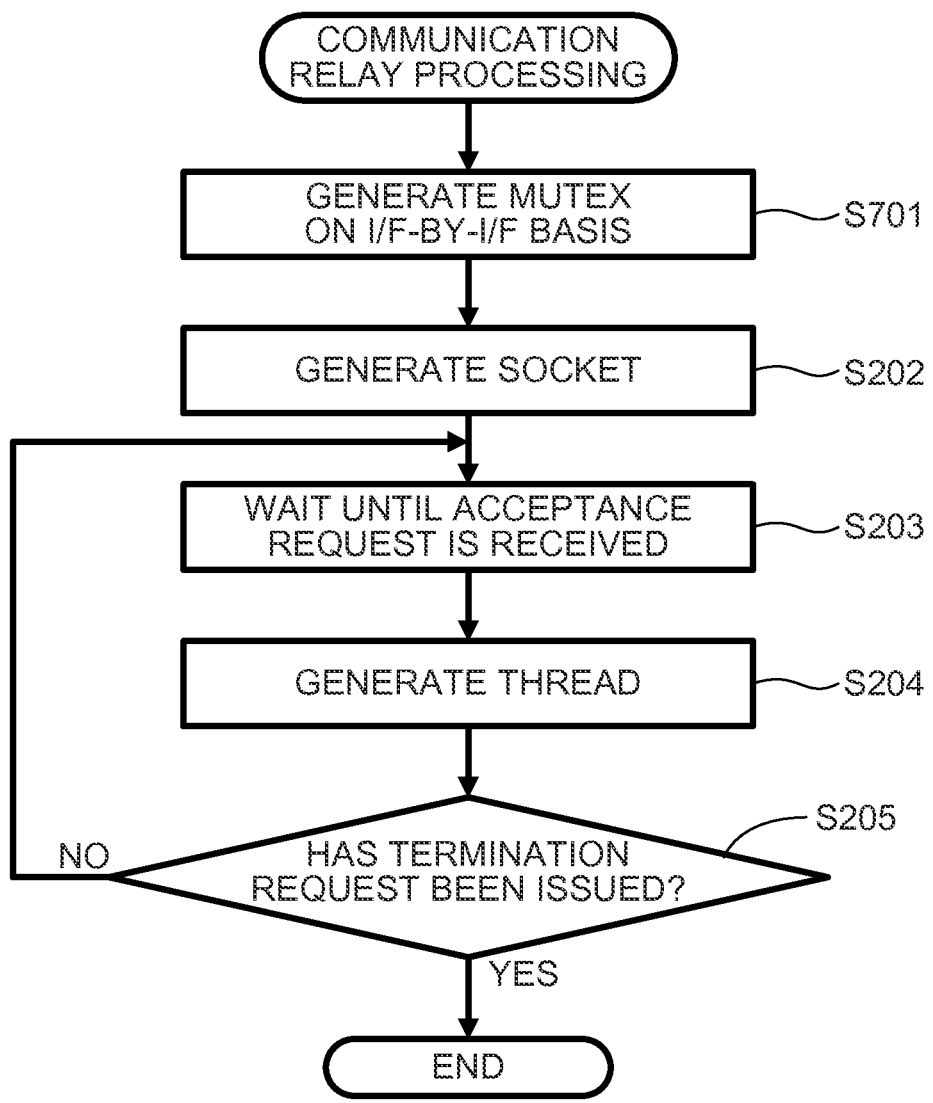
FIG. 10 is a flowchart of communication relay processing.
Figure 11:
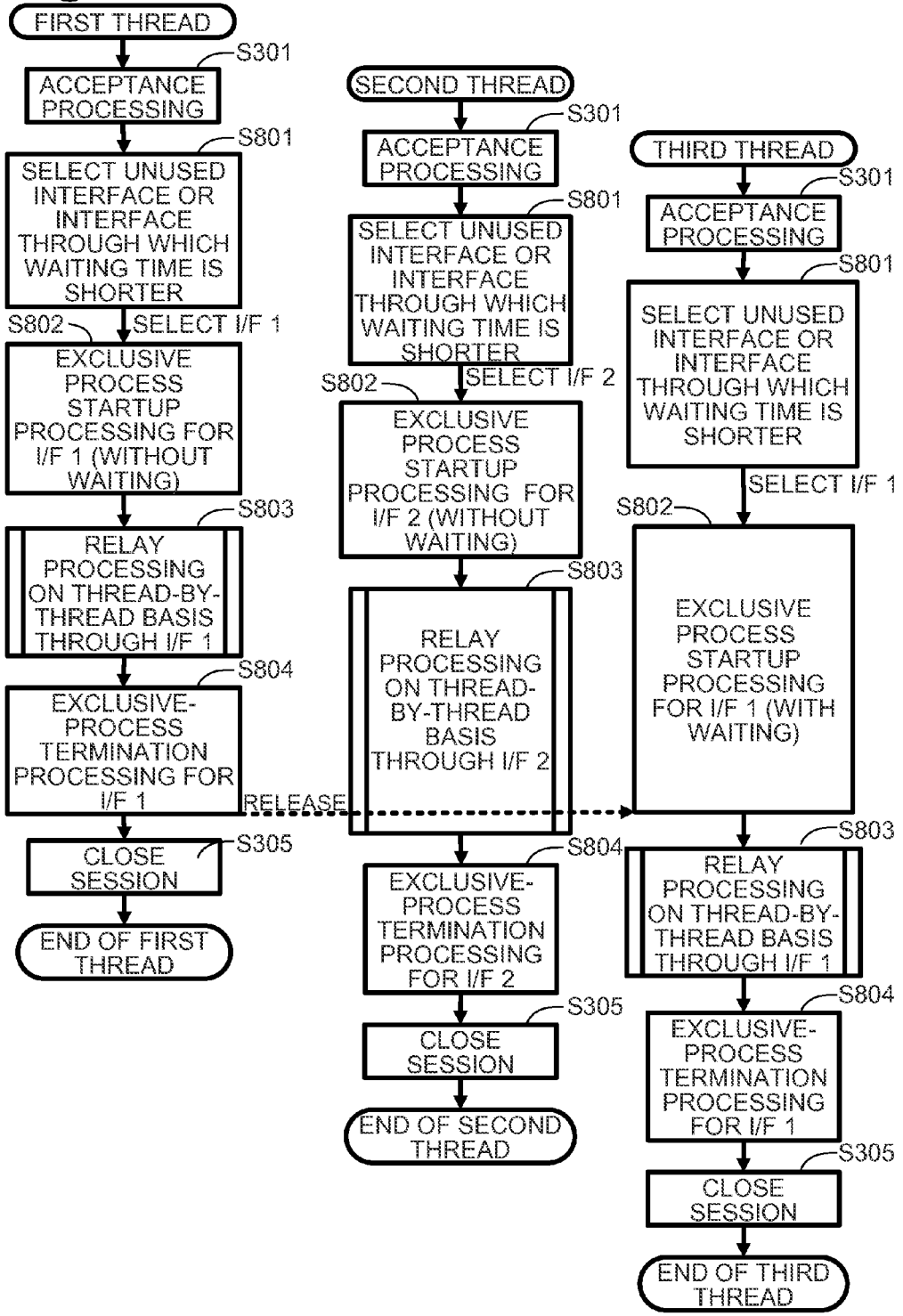
FIG. 11 includes flowcharts of processing that threads execute, according to a fourth embodiment.
Figure 12:
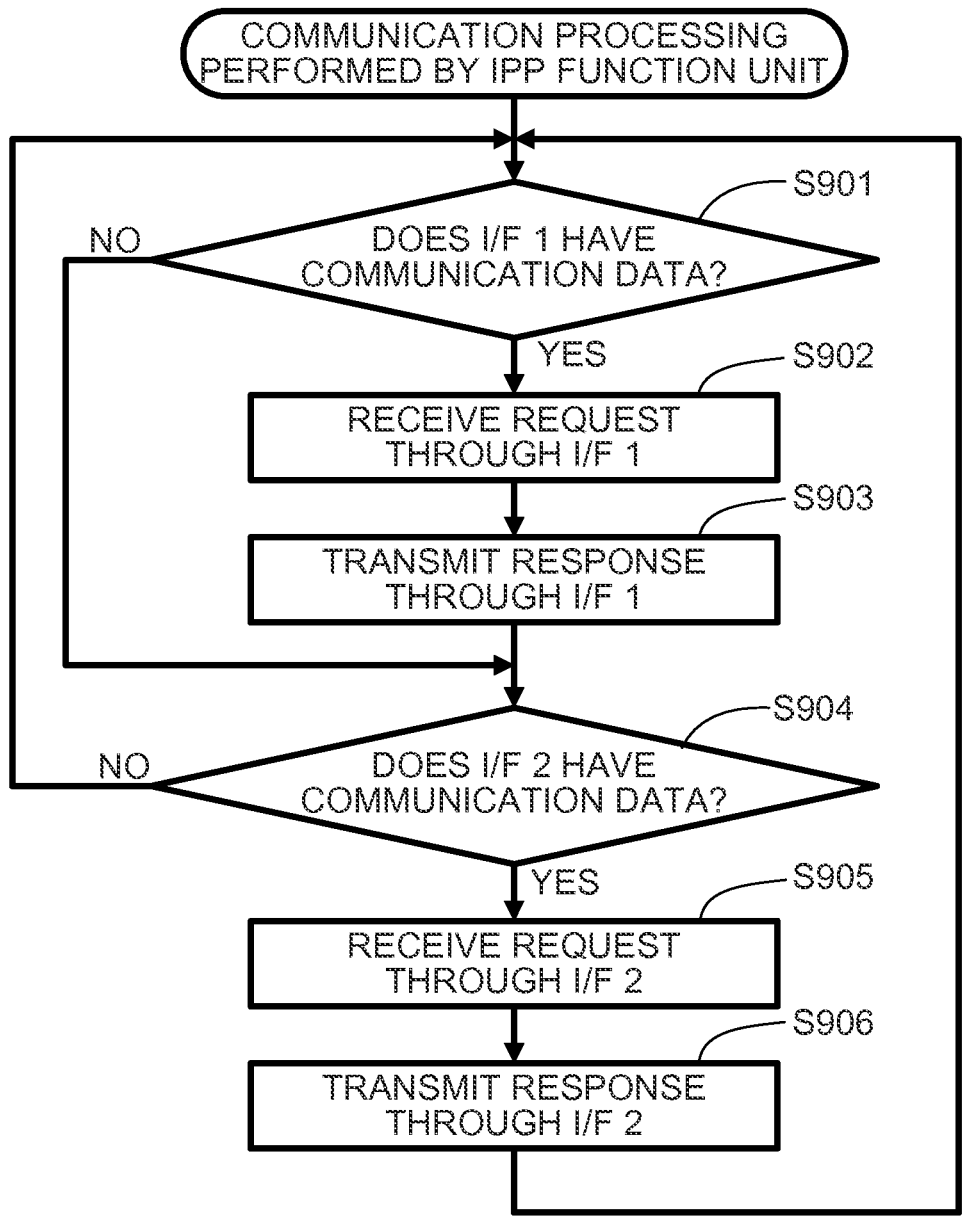
FIG. 12 is a flowchart of communication processing that an IPP function unit performs.

Next, a fourth embodiment will be described with reference to FIGS. 10 to 12.

The fourth embodiment is a modified example of the first embodiment. The IPP/USB conversion program 22 described above and according to the first embodiment performs communication for choosing settings for the printer 2 through an interface (specifically, the interface 1).

In contrast, the IPP/USB conversion program 22 according to the fourth embodiment establishes the interface 1, the interface 2, and an interface 3 between the printer 2 and the PC 1. The interface 3 also enables two-way communication.

The IPP/USB conversion program 22 performs communication for choosing settings for the printer 2 through the interfaces 1 and 2. Communication for transmitting print data to the printer 2 is performed through the interface 3.

(1) Details of Communication Relay Processing Performed by IPP/USB Conversion Program First, communication relay processing according to the fourth embodiment will be described with reference to FIG. 10. Note that an interface is denoted as I/F in FIG. 10.

In step S701, the IPP/USB conversion program 22 generates a Mutex for the interface 1 and a Mutex for the interface 2.

The processing in steps S202 to S205 is practically the same as that in the first embodiment. Thus, description thereof will be omitted.

Next, the flow of processing procedures for the first thread according to the fourth embodiment will be described with reference to FIG. 11. Here, the processing steps practically the same as those in the first embodiment will be denoted by the same reference numerals and description thereof will be omitted.

In step S801, the first thread selects an unused interface or an interface through which the waiting time is shorter from among the interfaces 1 and 2. Step S801 is an example of selection processing.

Here, when both the interfaces 1 and 2 are unused, the first thread selects the interface 1. Moreover, when both the interfaces 1 and 2 are used, the first thread selects an interface for which the number of threads waiting for the interface to be released is smaller. Moreover, when the interfaces 1 and 2 have the same number of threads waiting for the interface to be released, the first thread selects the interface 1.

At the time when the first thread is generated, any of the interfaces 1 and 2 has not yet been used, and thus the first thread selects the interface 1.

In step S802, the first thread executes an exclusive-process startup processing for the interface 1 selected in step S801. This exclusive-process startup processing is performed by obtaining the Mutex for the interface 1.

When the exclusive-process startup processing is executed for the interface 1, the interface 1 enters an in-use state. While the interface 1 is in the in-use state, when the second thread executes step S801, the second thread selects the interface 2, which is an unused interface, because the first thread is using the interface 1.

While the interfaces 1 and 2 are in the in-use state, when the third thread executes step S801, the third thread selects the interface 1 because both the interfaces 1 and 2 are being used. In this case, the third thread is in the state of waiting until the interface 1 is released.

In step S803, the first thread executes relay processing by using the interface 1.

In step S804, the first thread executes exclusive-process termination processing for the interface 1. When the exclusive-process termination processing is executed for the interface 1, the Mutex of the interface 1 is released and the third thread obtains the Mutex.

(2) Communication Processing Performed by IPP Function Unit

Next, communication processing according to the fourth embodiment and performed by the IPP function unit 31 will be described with reference to FIG. 12.

In step S901, the IPP function unit 31 determines whether or not the interface 1 has communication data. If YES in step S901, the procedure proceeds to step S902. If NO in step S901, the procedure proceeds to step S904.

In step S902, the IPP function unit 31 receives a request through the interface 1.

In step S903, the IPP function unit 31 transmits a response corresponding to the request received in step S902 to the IPP/USB conversion program 22 through the interface 1.

In step S904, the IPP function unit 31 determines whether or not the interface 2 has communication data. If YES in step S904, the procedure proceeds to step S905. If NO in step S904, the procedure returns to step S901.

In step S905, the IPP function unit 31 receives a request through the interface 2.

In step S906, the IPP function unit 31 transmits a response corresponding to the request received in step S905 to the IPP/USB conversion program 22 through the interface 2. After transmission of the response has been completed, the procedure returns to step S901.

(3) Effect of the Fourth Embodiment

When the IPP/USB conversion program 22 according to the fourth embodiment and described above is used, multi-session communication may be performed between the web browser 23 and the printer 2 without confusion through a plurality of interfaces that do not support multi-session communication.

Fifth Embodiment

Next, a fifth embodiment will be described with reference to FIG. 13.

Figure 13:
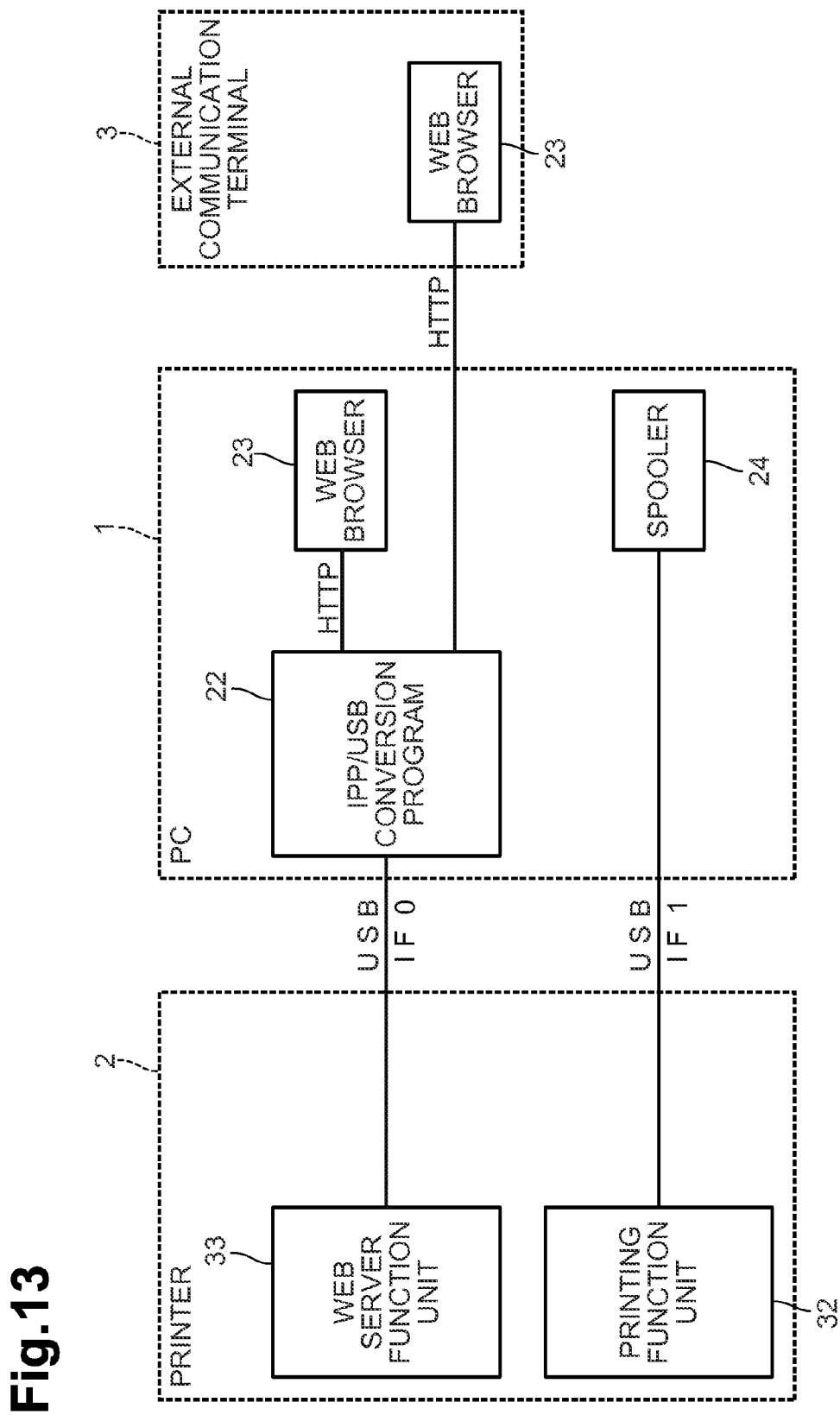
FIG. 13 is a block diagram illustrating a program configuration in the PC and function units of the printer, according to a fifth embodiment.

As illustrated in FIG. 13, the printer 2 according to the fifth embodiment does not include the IPP function unit 31. Instead, the printer 2 according to the fifth embodiment includes a web server function unit 33.

In this case, too, the web browser 23 performs multi-session communication, and consequently, there is a possibility that confusion occurs in responses. Thus, communication is performed with the web server function unit 33 via the IPP/USB conversion program 22 in the fifth embodiment. Note that, since the printer 2 does not have the IPP function unit 31, the IPP/USB conversion program 22 performs communication with the web server function unit 33 via a USB cable in accordance with the HTTP protocol.

The IPP/USB conversion program 22 stores a request in USB packets and transmits the USB packets to the web server function unit 33. The web server function unit 33 stores a response corresponding to the request in USB packets and transmits the USB packets to the IPP/USB conversion program 22. Here, as illustrated in FIG. 13, communication for choosing settings for the printer 2 is performed by using endpoint 0 in the fifth embodiment.

Moreover, since the printer 2 does not have the IPP function unit 31 in the fifth embodiment, the spooler 24 transmits print data to the printer 2 not via the IPP/USB conversion program 22. Communication between the spooler 24 and the printer 2 is performed through the interface 1.

When the IPP/USB conversion program 22 described above is used, even in the case where the printer 2 does not have the IPP function unit 31, multi-session communication may be performed between the web browser 23 and the printer 2 without confusion via a USB cable.

Other Embodiments

Embodiments are not limited to the above-described embodiments described with reference to the drawings. For example, the following embodiments also fall within the technical scope of the technologies disclosed in the present application.

(1) The web browser 23 is described as an example of the client application that performs multi-session communication in the above-described embodiments. However, the client application may be another application if the other application performs multi-session communication.

(2) USB cables are described as an example of communication interfaces in the above-described embodiments. However, such communication interfaces are not limited to USB cables. For example, communication may be performed between the PC 1 and the printer 2 in accordance with IEEE1284, which is a communication standard for printers.

(3) The case where a thread is newly generated every time establishing of a session is requested is described as an example in the above-described embodiments. However, without generating a thread, processing processes for sessions may be sequentially executed in communication relay processing. Alternatively, a process may be generated instead of a thread and processing may be performed by using the process instead of using the thread as in the above-described embodiments.

(4) The case where the PC 1 and the printer 2 are connected by a plurality of logical communication interfaces is described as an example in the fourth embodiment. However, the PC 1 and the printer 2 may be connected by a plurality of physical communication interfaces.

(5) The case where exclusive control is performed for sessions when multi-session communication is performed for choosing settings for the printer 2 is described as an example in the above-described embodiments. In addition, exclusive control may be performed for sessions in the case where multi-session communication is performed to transmit print data to the printer 2.

(6) The printer 2 is described as an example of the image processing apparatus in the above-described embodiments. However, the image processing apparatus may be what is called a multifunction printer, which has a printer function, a scanner function, a copier function, a facsimile function, and the like.

(7) Reception from the web browser 23 is performed after the exclusive process is started in the above-described embodiments. That is, reception of a request from the web browser 23 is not performed until the web browser 23 is permitted to perform execution in the exclusive process. However, it is desirable that the exclusive process be started before the web browser 23 transmits data to the printer 2 (the IPP function unit 31 or the web server function unit 33). Thus, the exclusive process may be started after a request is received from the web browser 23.

The technologies disclosed in the present application may be realized in various examples such as a communication relay apparatus, a communication relay method, a recording medium on which a communication relay program is stored, and the like.

What is claimed is:

1. A non-transitory machine-readable medium storing instructions that, when executed by a processor, cause an information processing apparatus connected to an image processing apparatus via a communication interface to:
   in response to a first request for establishment of a first session by a client application that performs multi-session communication, establish the first session between a communication relay program and the client application;
   in response to a second request for establishment of a second session by a client application that performs multi-session communication, after establishing the first session establish the second session between the communication relay program and the client application;
   perform a first communication process over the first session and prohibit a second communication process over the second session while both the first session and the second session are established, wherein a first communication is relayed between the client application and the image processing apparatus in the first communication process; and
   upon completion of the first communication process over the first session, perform the second communication process over the second session, wherein a second communication is relayed between the client application and the image processing apparatus in the second communication process.

2. The non-transitory machine-readable medium according to claim 1,
   wherein the communication includes one request and one response corresponding to the request, and
   wherein the instructions, when executed by the processor, further cause the information processing apparatus to determine that relaying of communication through the first session is completed when relaying of a pair of the request and the response is completed.

3. The non-transitory machine-readable medium according to claim 1,
   wherein the communication interface is configured to connect a Universal Serial Bus cable.

4. The non-transitory machine-readable medium according to claim 1,
   wherein the image processing apparatus includes a web server function unit,
   wherein the client application is a web browser, and
   wherein communication data is relayed for transmission and reception between the web browser and the web server function unit.

5. The non-transitory machine-readable medium according to claim 1,
   wherein the communication is communication for configuring for the image processing apparatus from the client application.

6. The non-transitory machine-readable medium according to claim 1,
   wherein the instructions that, when executed by the processor, further cause the information processing apparatus to:
   when receiving a request from the client application, transmit the request to the image processing apparatus and when receiving a response from the image processing apparatus, transmit the response to the client application, the response corresponding to the request, each of the request and the response includes a plurality of communication data;
   analyze communication data received from the client application and determine whether the communication data received from the client application indicates the end of the request;
   analyze communication data received from the image processing apparatus and determine whether the communication data received from the image processing apparatus indicates the end of the response;
   determine that reception of the request is completed where determined that the communication data received from the client application indicates the end of the request; and
   determine that reception of the response is completed where determined that the communication data received from the image processing apparatus indicates the end of the response.

7. The non-transitory machine-readable medium according to claim 1,
   wherein the instructions that, when executed by the processor, cause the information processing apparatus to:
   when receiving a request from the client application, transmit the request to the image processing apparatus and when receiving a response from the image processing apparatus, transmit the response to the client application, the response corresponding to the request, the request includes a plurality of communication data;
   provisionally determine that reception of the request from the client application is completed where communication data is not received for at least a first predetermined time after the last communication data has been received from the client application;
   determine that reception of the request from the client application is not completed where the response is not received from the image processing apparatus within a second predetermined time after the request has been transmitted to the image processing apparatus; and
   receive the rest of the communication data from the client application when it is determined that reception of the request from the client application is not completed.

8. The non-transitory machine-readable medium according to claim 7, wherein the instructions that, when executed by the processor, further cause the information processing apparatus to:
   inquire to the image processing apparatus as to whether transmission of the response is completed; and
   determine that reception of the response from the image processing apparatus is completed where a reply that the transmission of the response is completed is received from the image processing apparatus.

9. The non-transitory machine-readable medium according to claim 1,
   wherein the client application and the information processing apparatus are configured to transmit and receive pairs of a request and a response through each of the first and second sessions, wherein the instructions that, when executed by the processor, further cause the information processing apparatus to:

permit communication through a second session other than the first session when relaying of a pair of the request and the response is completed;

after communication through the second session other than the first session is permitted, start processing again from the determination as to whether communication through the first session is prohibited where a keeping signal, which indicates keeping of the first session, is received within a predetermined time; and close the first session where the keeping signal is not received within the predetermined time.

10. The non-transitory machine-readable medium according to claim 1, wherein the information processing apparatus comprises physical or logical communication interfaces, each communication interface is configured to connect the image processing apparatus, wherein the instructions that, when executed by the processor, further cause the information processing apparatus to:

select one of the communication interfaces is selected every time establishment of a session is requested by the client application; and prohibit communication through another session by using the same communication interface.

11. A communication relay apparatus comprising:

a communication interface configured to connect to an image processing apparatus;

a processer;

a storage device configured to store instructions that, when executed by the processor, cause the communication relay apparatus to:

in response to a first request for establishment of a first session by a client application that performs multi-session communication, establish the first session between a communication relay program and the client application;

after the first session has been established, determine whether communication through the first session is prohibited;

where determined that communication through the first session is prohibited, wait to communicate through the first session until communication through the first session is permitted;

in response to a second request for establishment of a second session by a client application that performs multi-session communication, after establishing the first session establish the second session between the communication relay program and the client application;

where determined that communication through the first session is permitted, perform the following:

perform a first communication process over the first session and prohibit a second communication process over the established second session while both the first session and the second session are established;

relay a first communication between the client application and the image processing apparatus through the first session in a state in which communication through the second session other than the first session is prohibited; and permit a second communication through the second session between the client application and the image processing apparatus when relaying of the first communication though the first session is completed.

12. A non-transitory machine-readable medium storing instructions that, when executed by a processor, cause an information processing apparatus connected to an image processing apparatus via a first communication interface and a second communication interface and having an internal web server function unit to:

in response to a first request for establishment of a first session by a client application that performs multi-session communication, establish the first session between a communication relay program and the client application over the first communication interface;

after the first session has been established, determine whether communication through the first session is prohibited;

where determined that communication through the first session is prohibited, wait to communicate through the first session until communication through the first session is permitted;

in response to a second request for establishment of a second session by a client application that performs multi-session communication, after establishing the first session establish the second session between the communication relay program and the client application;

where determined that communication through the first session is permitted, perform the following:

perform a first communication process during the first session and prohibit a second communication process over the established second session while both the first session and the second session are established;

relay a first communication between the client application and the image processing apparatus through the first session in a state in which communication through the second session other than the first session is prohibited;

permit a second communication through the second session other than the first session over the first communication interface when relaying of the first communication though the first session is completed; and transmit printing data to the image processing apparatus via the second communication interface.

* * * * *